United States Patent

Jung

[11] Patent Number: 5,805,226
[45] Date of Patent: Sep. 8, 1998

[54] METHOD AND APPARATUS FOR ENCODING A VIDEO SIGNAL BY USING A BLOCK TRUNCATION CODING METHOD

[75] Inventor: Hae-Mook Jung, Seoul, Rep. of Korea

[73] Assignee: Daewoo Electronics, O., Ltd., Seoul, Rep. of Korea

[21] Appl. No.: 617,589

[22] Filed: Mar. 19, 1996

[30] Foreign Application Priority Data

Mar. 20, 1995 [KR] Rep. of Korea ................. 95-5830

[51] Int. Cl.$^6$ ....................................... H04N 7/18
[52] U.S. Cl. ................. 348/420; 348/421; 348/384; 382/234
[58] Field of Search ............................ 348/419, 420, 348/421, 422, 384, 409, 405, 408; 382/166, 232, 205, 47, 234, 56

[56] References Cited

U.S. PATENT DOCUMENTS

| | | | |
|---|---|---|---|
| 4,742,553 | 5/1988 | Irwin | 382/47 |
| 5,343,539 | 8/1994 | Chan | 382/56 |
| 5,353,061 | 10/1994 | Rodriguez et al. | 348/409 |
| 5,387,938 | 2/1995 | Fukuda et al. | 348/420 |
| 5,392,072 | 2/1995 | Rodriguez et al. | 348/420 |
| 5,416,606 | 5/1995 | Katayama et al. | 358/467 |
| 5,453,787 | 9/1995 | Hancock et al. | 348/420 |
| 5,463,701 | 10/1995 | Kantner, Jr. et al. | 348/420 |
| 5,486,863 | 1/1996 | Auyeung et al. | 348/421 |
| 5,510,841 | 4/1996 | Iwamura | 348/420 |
| 5,524,067 | 6/1996 | Miyake et al. | 382/234 |
| 5,539,468 | 7/1996 | Suzuki et al. | 348/421 |

Primary Examiner—Tommy P. Chin
Assistant Examiner—Anand S. Rao
Attorney, Agent, or Firm—Pennie & Edmonds LLP

[57] ABSTRACT

A method for encoding a block of video signal which includes a plurality of frames, each of the frames is divided into a multiplicity of nonoverlapping blocks and each of the blocks contains K×K pixels, K being a positive integer. The method determines two reconstruction values and a bit plane for the block, scans K×K binary pixels included in the bit plane in a zigzag order for providing run-length and level values, encodes the run-length and the level values by using a predetermined variable length coding table, thereby providing a coded bit plane, determines a selection signal denoting either the bit plane or the coded bit plane which is represented with a fewer number of bits; choosing either the bit plane or the coded bit plane in response to the selection signal, and combines the two reconstruction values, and either of the bit plane and the coded bit plane which was selected.

16 Claims, 5 Drawing Sheets

FIG. 1A
(PRIOR ART)

| $f_1$ | $f_2$ | $f_3$ | $f_4$ |
|---|---|---|---|
| $f_5$ | $f_6$ | $f_7$ | $f_8$ |
| $f_9$ | $f_{10}$ | $f_{11}$ | $f_{12}$ |
| $f_{13}$ | $f_{14}$ | $f_{15}$ | $f_{16}$ |

FIG. 1B
(PRIOR ART)

| A | A | A | B |
|---|---|---|---|
| A | A | A | B |
| A | A | B | B |
| B | B | B | B |

FIG. 1C
(PRIOR ART)

| 0 | 0 | 0 | 1 |
|---|---|---|---|
| 0 | 0 | 0 | 1 |
| 0 | 0 | 1 | 1 |
| 1 | 1 | 1 | 1 |

METHOD AND APPARATUS FOR ENCODING A VIDEO SIGNAL BY USING A BLOCK TRUNCATION CODING METHOD

FIELD OF THE INVENTION

The invention relates to a video signal encoding apparatus; and, more particularly, to a method and an apparatus for encoding a bit plane which is generated in processing a video signal by using a Block Truncation Coding("BTC") method.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of digital data through the fixed channel, a video signal encoding method is normally used to compress the digital data.

A BTC method is one of such video signal compression techniques, which greatly reduces the amount of digital data while maintaining the picture quality.

To encode a video signal by using the BTC method, a frame of the video signal is divided into nonoverlapping blocks of a size K×K, K being a positive integer. Referring to FIG. 1A, there is shown an example of a block which is a unit of encoding in the BTC method. The block shown in FIG. 1A includes 16 pixels each of which is represented by one of symbols $f_1$ to $f_{16}$.

The $N(=K^2)$ pixels in a block are further divided into two groups (a bright and a dark groups) and intensity values of the pixels included in the block are then converted into one of two reconstruction values each of which denotes a representative intensity value of the pixels included in the bright or the dark group, respectively. In FIG. 1B, A and B are the reconstruction values, B representing the bright group. Consequently, the block is expressed by the two reconstruction values and a pattern denoting the representation of each of the pixels in the block by one of the two reconstruction values. The pattern is expressed by a bit plane, i.e., a block of binary images such as shown in FIG. 1C.

The two reconstruction values are determined from a sample mean and a sample variance which characterize brightness and contrast of the block, respectively. The sample mean $f_M$ and the sample variance $f_v^2$ of the intensity values of the pixels included in the block shown in FIG. 1A may be calculated as follows:

$$f_M = \frac{1}{N} \sum_{i=1}^{N} f_i \quad \text{Eq. 1}$$

$$f_v = \sqrt{\frac{1}{N} \sum_{i=1}^{N} (f_i^2 - f_M^2)} \quad \text{Eq. 2}$$

wherein N represents the number of pixels contained in the block; i denotes an integer ranging from 1 to N; and $f_i$ is an intensity value of a pixel denoted with the same symbol in FIG. 1A.

The two reconstruction values are decided so that a sample mean and a sample variance for the two-tone block shown in FIG. 1B are the same as those of the original block shown in FIG. 1A, respectively. To do this, the two reconstruction values, i.e., A and B, are determined as follows:

$$A = f_M - f_v \sqrt{\frac{L}{N-L}} \quad \text{Eq. 3}$$

$$B = f_M + f_v \sqrt{\frac{N-L}{L}}$$

wherein L represents the number of pixels whose intensity values are greater than or equal to the sample mean $f_M$.

Referring back to FIG. 1B, pixels whose intensity values are less than $f_M$ are represented by A while the others are represented by B. On the other hand, in the bit plane shown in FIG. 1C, pixels whose intensity values are smaller than $f_M$ are represented by 0 while the others are represented by 1.

The two reconstruction values and the bit plane determined at an encoder are transmitted to a corresponding decoder wherein the bit plane indicates whether each pixel in the block belongs to the bright group or the dark group and each of the two reconstruction values represents reconstructed pixel values in each group, respectively, at the decoder.

By representing a block of video signal by two reconstruction values and a bit plane, amount of data to be transmitted on a channel is greatly reduced.

At the corresponding decoder, the bit plane as well as the two reconstruction values are decoded into a block of reconstructed video signal. There may exist nontrivial difference between an original and a reconstructed video signal, because as many as K×K different pixel intensity values are represented by only two reconstruction values. However, since the sample mean and the sample variance for each of the blocks are preserved throughout the whole BTC process, the brightness, the contrast and most visible features within each block are well preserved. In the absence of a large grey-level variation within a block, the smaller variations are retained. This will closely match the human visual system's response in that large variations tend to mask smaller variations within their vicinity. Therefore, the reconstructed video signal can be a good approximation to the original signal despite the large reduction in the number of bits made during the BTC process.

Meanwhile, if every binary pixel included in the bit plane is transmitted without further processing, as many as K×K bits are required to represent the bit plane. Therefore, the number of bits used in encoding a frame of video signal is the same as the number of pixels in the frame added by the number of bits consumed in encoding the reconstruction values for each of the blocks. Although the number of bits to be transmitted is reduced by using the conventional BTC method, a large number of bits are still used in transmitting the bit plane. Since, in the conventional BTC scheme described above, the bit plane is not processed for data compression, by processing the binary pixels contained in the bit plane, a further reduction of bits in encoding the video signal can be achieved.

SUMMARY OF THE INVENTION

It is, therefore, a primary object of a invention to provide a method and an apparatus, for use in an encoder which encodes a video signal by using a BTC method, for encoding bit planes by using a zigzag scanning, a Run-Length Coding ("RLC") method and a Variable Length Coding ("VLC") method.

In accordance with the present invention, there is provided an apparatus for encoding a video signal to provide a coded video signal, wherein the video signal includes a plurality of frames, each of the frames is divided into a multiplicity of nonoverlapping blocks and each of the blocks contains K×K pixels, K being a positive integer, said apparatus comprising:

means, for each block, for determining a sample mean and a sample variance of the K×K pixels included in said block;

means for dividing the pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

means, for said each block, for deciding a bit plane which contains K×K binary pixels, each of the binary pixels denoting either the bright or the dark group where a corresponding pixel in said each block belongs to;

means, for said each block, for scanning the K×K binary pixels included in the bit plane in a zigzag order and for providing run-length and level values;

means, for said each block, for encoding the run-length and the level values by using a predetermined variable length coding table, thereby providing a coded bit plane;

means, for said each block, for determining a selection signal denoting either the bit plane or the coded bit plane which is represented with a fewer number of bits;

selection means, for said each block, for choosing either the bit plane or the coded bit plane in response to the selection signal; and means, for said each block, for combining the two reconstruction values, and either of the bit plane and the coded bit plane selected at the selection means, to thereby provide the coded video signal.

BRIEF DESCRIPTION OF THE DRAWINGS

The above and other objects and features of the present invention will become apparent from the following description of preferred embodiments given in conjunction with the accompanying drawings, in which:

FIGS. 1A to 1C exemplify a block of video signal and its corresponding two-tone block and bit plane used in the BTC method;

DETAILED DESCRIPTION OF THE PREFERRED EMBODIMENTS

Figure 2:
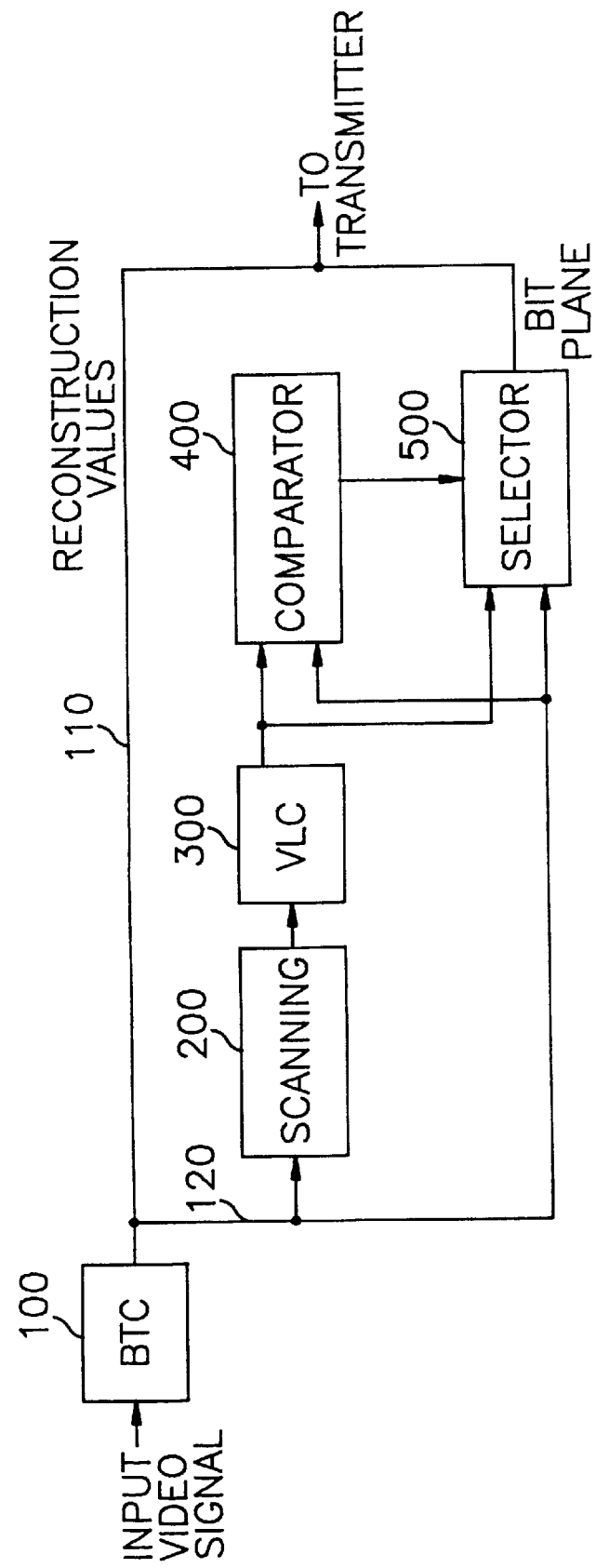
FIG. 2 provides a block diagram of an encoding device in accordance with a preferred embodiment of the present invention.

Referring to FIG. 2, there is shown a block diagram of an encoding device in accordance with a first embodiment of the present invention which includes a BTC block 100, a scanning block 200, a VLC block 300, a comparator 400 and a selector 500.

An input video signal is fed to the BTC block 100 wherein a frame of the video signal is divided into a multiplicity of blocks of size K×K, K being a positive integer, and each of the blocks is processed by using a conventional BTC method.

Specifically, a sample mean and a sample variance of K×K pixels included in a block are first determined. Then, the K×K pixels included in the block are divided into a bright and a dark groups based on the intensity values of the pixels. Two reconstruction values each of which denotes a representative intensity value of the pixels included in the bright or the dark group, respectively, are also decided at the BTC block 100 in response to the sample mean and the sample variance.

A bit plane for the block is also determined at the BTC block 100 wherein the bit plane has K×K binary pixels, a value of each binary pixel denoting either the bright or the dark group where each of the pixels in the block belongs to.

The two reconstruction values derived at the BTC block 100 are provided on a line 110 which is coupled to a subsequent part of the encoding device (not shown), e.g., a transmitter for the transmission thereof, while the bit plane is coupled to the scanning block 200 by a line 120.

Figure 3:
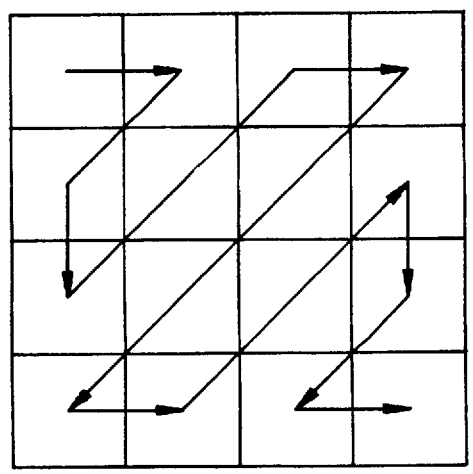
FIG. 3 shows a scanning order of a bit plane in accordance with the first embodiment of the present invention.

In accordance with the present invention, the bit plane is coded by using a RLC technique. To do this, the bit plane, similar to the one shown in FIG. 1C for K=4, is first scanned in a zigzag order as depicted in FIG. 3 at the scanning block 200. Referring to FIG. 3, the scanning order starts at the upper left corner of the bit plane, eventually reaching the bottom right corner. A run-length value is the number of zeros between two nonzero components in the bit plane shown in FIG. 1C.

The run-length and the level values obtained by scanning the bit plane shown in FIG. 1C in the order specified in FIG. 3 are presented in Table 1.

TABLE 1

| RUN-LENGTH | LEVEL |
|---|---|
| 6 | 1 |
| 2 | 1 |
| 0 | 1 |
| 0 | 1 |
| 0 | 1 |
| 0 | 1 |
| 0 | 1 |
| 0 | 1 |

As shown in Table 1, the level values obtained from the bit plane are always 1. The run-length and level values from the scanning block 200 are fed to the VLC block 300 and converted to a coded bit plane of variable length. At the VLC block 300, each pair of run-length and level values is converted to a codeword of variable length using a predetermined VLC table wherein pairs of run-length and level values and their corresponding codewords are listed. The VLC table is predetermined in such a manner that a shorter codeword is assigned to a more frequently occurring pair of run-length and level values. Actually, since the level values are always fixed as 1, run-length value alone is considered in determining a corresponding codeword.

The coded bit plane is fed to the comparator 400 wherein the bit numbers used in representing the uncoded bit plane form the BTC block 100 and the coded bit plane from the VLC block 300, respectively, are compared with each other to decide which one of the bit planes occupies shorter bits. The comparator 400 generates a selection signal identifying which of the uncoded or the coded bit planes has shorter bits and provides the selection signal to the selector 500.

In addition to the selection signal, the uncoded bit plane from the BTC block 100 and the coded bit plane from the VLC block 300 are also coupled to the selector 500. In response to the selection signal, the selector 500 provides either the uncoded or the coded bit plane to a subsequent part of the encoding device, e.g., a transmitter(not shown), to which the reconstruction values are coupled. That is, either the uncoded or the coded bit plane, which can be represented by shorter bits, is selected and coupled to the transmitter.

The two reconstruction values provided from the BTC block 100 and the bit plane supplied from the selector 500 are combined together and fed to the transmitter for transmission to a decoding device corresponding to the encoding device of the present invention.

As described above, by incorporating the RLC and the VLC methods in encoding the bit plane, the number of bits, i.e., the bandwidth occupied in carrying the information contained in the video signal is reduced compared with the conventional BTC method.

Figure 4:
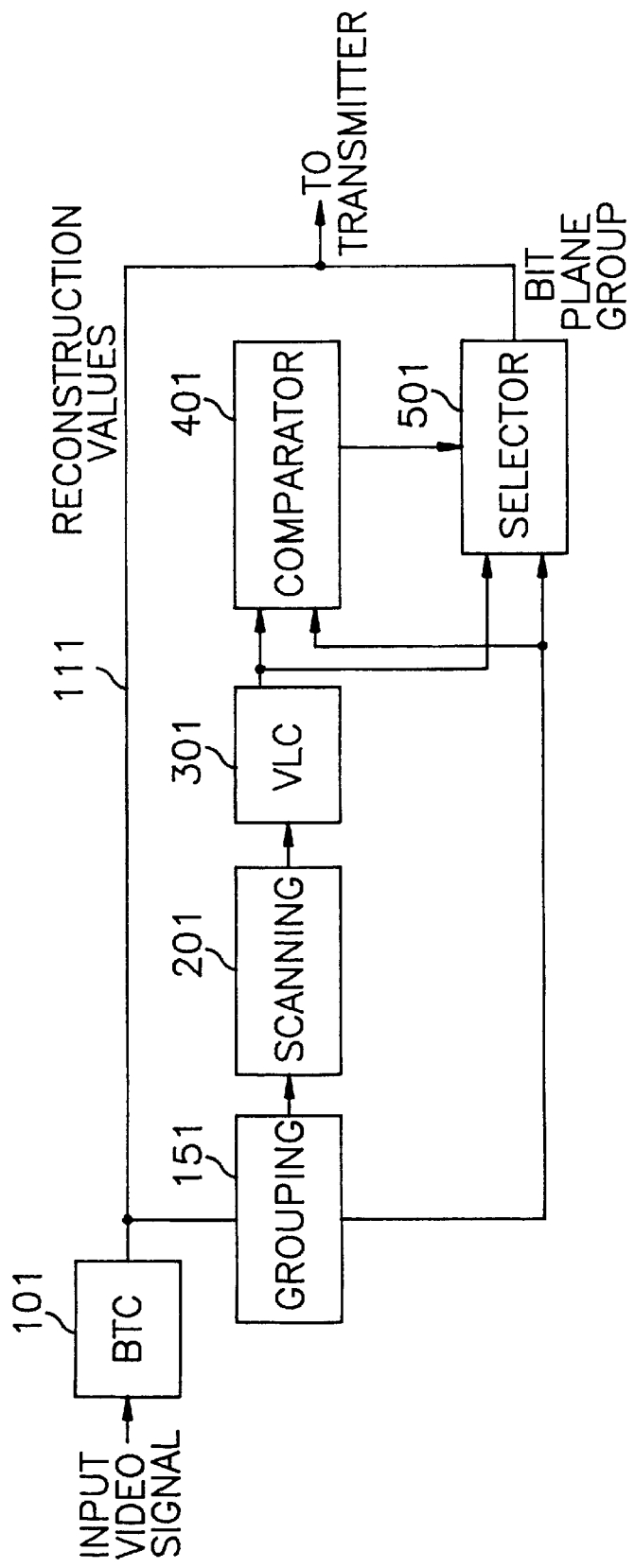
FIG. 4 represents a block diagram of an encoding device in accordance with another preferred embodiment of the present invention.

Referring to FIG. 4, there is shown a block diagram of an encoding device in accordance with a second embodiment of the present invention which includes a BTC block 101, a grouping block 151, a scanning block 201, a VLC block 301, a comparator 401 and a selector 501. But for the grouping block 151, the overall structure and operation of the encoding device are similar to that of the first embodiment shown in FIG. 2.

An input video signal is fed to the BTC block 101 wherein a frame of the video signal is divided into a multiplicity of blocks of size K×K, K being a positive integer, and each of the blocks is processed by using a conventional BTC method.

Specifically, two reconstruction values are derived at the BTC block 101 and provided on a line 111 which is coupled to a subsequent part of the encoding device (not shown), e.g., a transmitter for the transmission thereof. A bit plane decided at the BTC block 101 is coupled to the grouping block 151.

Figure 5:
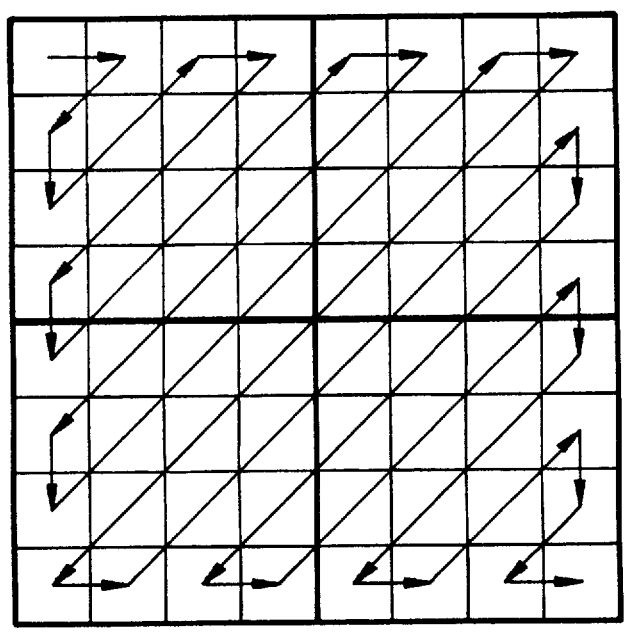
FIG. 5 illustrates a scanning order of a bit plane in accordance with the second embodiment of the present invention.

In accordance with the second embodiment of the present invention, a predetermined number of bit planes are combined in the grouping block 151 before it is coded by using the RLC technique. For instance, bit planes for four neighboring blocks are combined to form a bit plane group including 8×8 binary pixels as shown in FIG. 5. The bit plane group is coupled to the scanning block 201.

At the scanning block 201, the bit plane group is scanned in a zigzag order as depicted in FIG. 5. As shown in FIG. 5, the scanning order starts at the upper left corner of the bit plane group, eventually reaching the bottom right corner. The second embodiments differs from the first embodiment in that the bit plane group is a unit of the scanning instead of the bit plane.

The optimum size of the bit plane group which can produce a shortest codeword when the bit plane group is coded using the RLC and VLC methods depends on the characteristics of the input signal. Therefore, it is advantageous to decide the size of the bit plane group adaptively according to the image characteristics.

The run-length and the level values obtained by scanning the bit plane group in the order specified in FIG. 5 are fed to the VLC block 301 and converted to a coded bit plane group of variable length by using a predetermined VLC table therein.

The coded bit plane group is fed to the comparator 401 wherein the bit numbers used in representing the uncoded bit plane group from the grouping block 151 and the coded bit plane group from the VLC block 301, respectively, are compared with each other to decide which one of the bit plane groups occupies shorter bits. The comparator 401 generates a selection signal identifying which of the uncoded or the coded bit plane groups has shorter bits and provides the selection signal to the selector 501.

In addition to the selection signal, the uncoded bit plane group from the grouping block 151 and the coded bit plane group from the VLC block 301 are also coupled to the selector 501. In response to the selection signal, the selector 501 provides either the uncoded or the coded bit plane group to a subsequent part of the encoding device, e.g., a transmitter(not shown), to which the reconstruction values are coupled. That is, either the uncoded or the coded bit plane group, which can be represented by shorter bits, is selected and coupled to the transmitter.

The two reconstruction values provided from the BTC block 101 and the bit plane group supplied from the selector 501 are combined together and fed to the transmitter for transmission to a corresponding decoding device.

While the present invention has been described with respect to certain preferred embodiments only, other modifications and variations may be made without departing from the spirit and scope of the present invention as set forth in the following claims.

What is claimed is:

1. An apparatus for encoding a video signal to provide a coded video signal, wherein the video signal includes a plurality of frames, each of the frames is divided into a multiplicity of nonoverlapping blocks and each of the blocks contains K×K pixels, K being a positive integer, said apparatus comprising:

means, for each block, for determining a sample mean and a sample variance of the K×K pixels included in said block;

means for dividing the pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

means, for said each block, for deciding a bit plane which contains K×K binary pixels, each of the binary pixels denoting either the bright or the dark group where a corresponding pixel in said each block belongs to;

means, for said each block, for scanning the K×K binary pixels included in the bit plane in a zigzag order and for providing run-length and level values;

means, for said each block, for encoding the run-length and the level values by using a predetermined variable length coding table, thereby providing a coded bit plane;

means, for said each block, for determining a selection signal denoting either the bit plane or the coded bit plane which is represented with a fewer number of bits;

selection means, for said each block, for choosing either the bit plane or the coded bit plane in response to the selection signal; and means, for said each block, for combining the two reconstruction values, and either of the bit plane and the coded bit plane selected at the selection means, to thereby provide the coded video signal.

2. A method for encoding a video signal to provide a coded video signal, wherein the video signal includes a plurality of frames, each of the frames is divided into a multiplicity of nonoverlapping blocks and each of the blocks contains K×K pixels, K being a positive integer, which comprises the steps of:

(a) determining a sample mean and a sample variance of the K×K pixels included in a block;

(b) dividing pixels included in the block into a bright group and a dark group based on intensity values of the pixels and determining two reconstruction values, in response to the sample mean and the sample variance, each of the reconstruction values denoting a representative intensity value of the pixels included in the bright or the dark group;

(c) deciding a bit plane which contains K×K binary pixels, each of the binary pixels representing either the bright or the dark group where a corresponding pixel in the block belongs to;

(d) scanning the K×K binary pixels included in the bit plane in a zigzag order and for providing run-length and level values;

(e) encoding the run-length and the level values by using a predetermined variable length coding table, thereby providing a coded bit plane;

(f) determining a selection signal denoting either the bit plane or the coded bit plane which is represented with a fewer number of bits;

(g) choosing either the bit plane or the coded bit plane in response to the selection signal;

(h) combining the two reconstruction values, and either of the bit plane and the coded bit plane selected at step (g), to thereby provide the coded video signal for the block of video signal; and (i) repeating steps (a) to (h) for a next block of video signal.

3. An apparatus for encoding a video signal to provide a coded video signal, wherein the video signal includes a plurality of frames, each of the frames is divided into a multiplicity of nonoverlapping blocks and each of the blocks contains K×K pixels, K being a positive integer, said apparatus comprising:

means, for each block, for determining a sample mean and a sample variance of the K×K pixels included in said block;

means for dividing the pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

means, for said each block, for deciding a bit plane which contains K×K binary pixels, each of the binary pixels denoting either the bright or the dark group where a corresponding pixel in said each block belongs to;

means, for said each block, for scanning the K×K binary pixels included in the bit plane in a zigzag order and for providing run-length and level values;

means, for said each block, for encoding the run-length and the level values by using a predetermined variable length coding table, thereby providing a coded bit plane; and means, for said each block, for combining the two reconstruction values, and the coded bit plane, to thereby provide the coded video signal.

4. A method for encoding a video signal to provide a coded video signal, wherein the video signal includes a plurality of frames, each of the frames is divided into a multiplicity of nonoverlapping blocks and each of the blocks contains K×K pixels, K being a positive integer, comprises the steps of:

(a) determining a sample mean and a sample variance of the K×K pixels included in a block;

(b) dividing pixels included in the block into a bright group and a dark group based on intensity values of the pixels and determining two reconstruction values, in response to the sample mean and the sample variance, each of the reconstruction values denoting a representative intensity value of the pixels included in the bright or the dark group;

(c) deciding a bit plane which contains K×K binary pixels, each of the binary pixels representing either the bright or the dark group where a corresponding pixel in the block belongs to;

(d) scanning the K×K binary pixels included in the bit plane in a zigzag order and for providing run-length and level values;

(e) encoding the run-length and the level values by using a predetermined variable length coding table, thereby providing a coded bit plane;

(f) combining the two reconstruction values, and the bit plane and the coded bit plane, to thereby provide the coded video signal for the block of video signal; and (g) repeating steps (a) to (f) for a next block of video signal.

5. An apparatus for encoding a video signal to provide a coded video signal, wherein the video signal includes a plurality of frames, each of the frames is divided into a multiplicity of nonoverlapping blocks and each of the blocks contains K×K pixels, K being a positive integer, said apparatus comprising:

means, for each block, for determining a sample mean and a sample variance of the K×K pixels included in said block;

means for dividing the pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

means, for said each block, for deciding a bit plane which contains K×K binary pixels, each of the binary pixels denoting either the bright or the dark group where a corresponding pixel in said each block belongs to;

means for providing bit plane groups wherein each bit plane group is obtained by combining M×M bit planes and contains L×L binary pixels, L being K×M, and L and M being positive integers;

means for scanning the L×L binary pixels included in said each bit plane group in a zigzag order and for providing run-length and level values;

means for encoding the run-length and the level values for said each bit plane group by using a predetermined variable length coding table, thereby providing a coded bit plane group;

means for determining a selection signal denoting either the bit plane group or the coded bit plane group which is represented with a fewer number of bits;

selection means for choosing either the bit plane group or the coded bit plane group in response to the selection signal; and means for combining the two reconstruction values for the M×M bit planes included in said each bit plane group, and either of the bit plane group and the coded bit plane group selected at the selection means, to thereby provide the coded video signal.

6. A method for encoding a video signal to provide a coded video signal, wherein the video signal includes a plurality of frames, each of the frames is divided into a multiplicity of nonoverlapping blocks and each of the blocks contains K×K pixels, K being a positive integer, which comprises the steps of:

(a) determining a sample mean and a sample variance of the K×K pixels included in each block;

(b) dividing pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

(c) deciding, for said each block, a bit plane which contains K×K binary pixels, each of the binary pixels representing either the bright or the dark group where a corresponding pixel in the block belongs to;

(d) providing a bit plane group by combining M×M bit planes, the bit plane group containing L×L binary pixels, L being K×M, L and M being positive integers;

(e) scanning the L×L binary pixels included in said bit plane group in a zigzag order and for providing run-length and level values;

(f) encoding the run-length and the level values by using a predetermined variable length coding table, thereby providing a coded bit plane group;

(g) determining a selection signal denoting either the bit plane group or the coded bit plane group which is represented with a fewer number of bits;

(h) choosing either the bit plane group or the coded bit plane group in response to the selection signal;

(i) combining the two reconstruction values for each of the M×M bit planes, and either of the bit plane group and the coded bit plane group selected at step (h), to thereby provide the coded video signal for the bit plane group; and (j) repeating steps (d) to (i) for the remaining bit planes.

7. An apparatus for encoding a video signal to provide a coded video signal, wherein the video signal includes a plurality of frames, each of the frames is divided into a multiplicity of nonoverlapping blocks and each of the blocks contains K×K pixels, K being a positive integer, said apparatus comprising:

means, for each block, for determining a sample mean and a sample variance of the K×K pixels included in said block;

means for dividing the pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

means for said each block, for deciding a bit plane which contains K×K binary pixels, each of the binary pixels denoting either the bright or the dark group where a corresponding pixel in said each block belongs to;

means for providing bit plane groups wherein each bit plane group is obtained by combining M×M bit planes and contains L×L binary pixels, L being K×M, L and M being positive integers;

means for scanning the L×L binary pixels included in said each bit plane group in a zigzag order and for providing run-length and level values;

means for encoding the run-length and the level values for said each bit plane group by using a predetermined variable length coding table, thereby providing a coded bit plane group; and means for combining the two reconstruction values for the M×M bit planes included in said each bit plane group and the coded bit plane group, to thereby provide the coded video signal.

8. A method for encoding a video signal to provide a coded video signal, wherein the video signal includes a plurality of frames, each of the frames is divided into a multiplicity of nonoverlapping blocks and each of the blocks contains K×K pixels, K being a positive integer, which comprises the steps of:

(a) determining a sample mean and a sample variance of the K×K pixels included in each block;

(b) dividing pixels included in said each block into a bright group and a dark group based on intensity values of the pixels and determining two reconstruction values, in response to the sample mean and the sample variance, each of the reconstruction values denoting a representative intensity value of the pixels included in the bright or the dark group;

(c) deciding, for said each block, a bit plane which contains K×K binary pixels, each of the binary pixels representing either the bright or the dark group where a corresponding pixel in the block belongs to;

(d) providing a bit plane group by combining M×M bit planes, the bit plane group containing L×L binary pixels, L being K×M, L and M being positive integers;

(e) scanning the L×L binary pixels included in the bit plane group in a zigzag order and for providing run-length and level values;

(f) encoding the run-length and the level values by using a predetermined variable length coding table, thereby providing a coded bit plane group;

(g) combining the two reconstruction values for each of the M×M bit planes, and the coded bit plane group, to thereby provide the coded video signal for the bit plane group; and (h) repeating steps (d) to (g) for the remaining bit planes.

9. The apparatus of claim 1, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

10. The method of claim 2, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

11. The apparatus of claim 3, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

12. The method of claim 4, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

13. The apparatus of claim 5, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

14. The method of claim 6, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

15. The apparatus of claim 7, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

16. The method of claim 8, wherein the two reconstruction values, A and B, are given by:

$$A = f_M - f_V \sqrt{\frac{L}{N-L}}$$

$$B = f_M + f_V \sqrt{\frac{N-L}{L}}$$

wherein $f_M$ is the sample mean and $f_V^2$ is the sample variance of the intensity values of the pixels in the block, N is the number of pixels in the block and L is the number of pixels whose intensity values are greater than $f_M$.

* * * * *

UNITED STATES PATENT AND TRADEMARK OFFICE
CERTIFICATE OF CORRECTION

PATENT NO. : 5,805,226

DATED : September 8, 1998

INVENTOR(S) : Hae-Mook JUNG

It is certified that error appears in the above-identified patent and that said Letters Patent is hereby corrected as shown below:

TITLE PAGE [73] Assignee: change "Daewoo Electronics, O., Ltd." to

-- Daewoo Electronics, Co., Ltd.--.

Signed and Sealed this

Twenty-third Day of February, 1999

Attest:

Q. TODD DICKINSON

*Attesting Officer*     *Acting Commissioner of Patents and Trademarks*